US009944232B2

(12) United States Patent
Peregrina Loera et al.

(10) Patent No.: US 9,944,232 B2
(45) Date of Patent: Apr. 17, 2018

(54) LATCHING MECHANISM FOR AUTOMOTIVE UNDER SEAT DRAWER

(71) Applicant: FORD GLOBAL TECHNOLOGIES, LLC, Dearborn, MI (US)

(72) Inventors: Jose Alfredo Peregrina Loera, Mexico City (MX); Omar Antonio Ramirez Pavon, Portales Norte (MX)

(73) Assignee: Ford Global Technologies LLC, Dearborn, MI (US)

( * ) Notice: Subject to any disclaimer, the term of this patent is extended or adjusted under 35 U.S.C. 154(b) by 19 days.

(21) Appl. No.: 15/216,014

(22) Filed: Jul. 21, 2016

(65) Prior Publication Data
US 2018/0022282 A1  Jan. 25, 2018

(51) Int. Cl.
  *B60R 7/04*  (2006.01)
(52) U.S. Cl.
  CPC .................................. *B60R 7/043* (2013.01)
(58) Field of Classification Search
  CPC ...................................................... B60R 7/043
  See application file for complete search history.

(56) References Cited

U.S. PATENT DOCUMENTS

| 2,343,977 | A |   | 3/1944 | Jones et al. |
| 2,379,157 | A |   | 6/1945 | Jones |
| 2,510,807 | A | * | 6/1950 | Fosberg ................. B42F 17/08 |
|           |   |   |        | 126/340 |
| 2,918,318 | A |   | 12/1959 | Sacharski |
| 3,026,141 | A |   | 3/1962 | Welles et al. |
| 5,065,920 | A |   | 11/1991 | Amner |
| 5,388,902 | A |   | 2/1995 | Huebschen et al. |
| 2017/0096108 | A1 | * | 4/2017 | Peregrina Loera ....... B60R 7/04 |

FOREIGN PATENT DOCUMENTS

| CN | 103129476 A | 6/2013 |
| KR | 20000001468 A | 1/2000 |
| KR | 20140082311 A | 7/2014 |

OTHER PUBLICATIONS

English Machine Translation of KR20140082311A.
English Machine Translation of KR20000001468A.
English Machine Translation of CN103129476A.

* cited by examiner

*Primary Examiner* — Lori L Lyjak
(74) *Attorney, Agent, or Firm* — Vichit Chea; King & Schickli, PLLC

(57) ABSTRACT

An apparatus for selectively latching a drawer for storing objects and movable in a travel direction from beneath an automotive seat. The apparatus comprises one or more latches movable transverse to the travel direction from a latched position retaining the drawer closed and an unlatched position, the latch including a follower. A vertically movable handle including a cam cooperating with the follower for moving the latch to the unlatched position for releasing the drawer for opening. The latches and handle may be securely supported for sliding movement by vertical and lateral guides on a front wall of the drawer.

20 Claims, 8 Drawing Sheets

LATCHING MECHANISM FOR AUTOMOTIVE UNDER SEAT DRAWER

TECHNICAL FIELD

This document relates generally to the motor vehicle field and, more particularly, to a latching mechanism for an automotive under seat drawer.

BACKGROUND

Under seat drawers conveniently allow for the secure storage of articles in an automobile. Opening and closing of the drawer may be achieved using a latching mechanism. The latching mechanism should be inexpensive to implement, easy to use, reliable in operation, and perhaps most importantly should not create excessive noise during the operation of the automobile. For various reasons, past approaches have not met with success on these fronts, particularly in relation to the issue of noise.

Accordingly, a need is identified for an improved latching mechanism for an automotive under seat drawer.

SUMMARY

According to one aspect of the disclosure, an apparatus is providing for storage under an automotive seat. The apparatus includes a drawer movable in a travel direction from beneath the automotive seat. A latch is movable transverse to the travel direction from a latched position retaining the drawer closed and an unlatched position, the latch including a follower. A vertically movable handle includes a cam cooperating with the follower for moving the latch to the unlatched position for releasing the drawer for opening.

In one embodiment, a second latch movable transverse to the travel direction from a latched position retaining the drawer closed and an unlatched position for releasing the drawer for opening is also provided. The second latch includes a second follower for engaging a second cam of the handle. The first and second latches are movable in opposite directions between the latched and unlatched positions.

Each follower may comprise a sloped wall on the latch. Each cam may comprise a pin for engaging the sloped wall and moving the latch inwardly as the handle moves upwardly in the vertical direction. Guides on a front wall of the drawer may support the latch and the handle. A spring for urging the latch to the latched position may also be provided.

A guide may also be provided for receiving a first portion of the latch in the latched position. The first portion of the latch may disengage the guide for releasing the drawer for opening. The guide may comprise an opening elongated in a vertical direction. The guide may further include a wall for engaging a second portion of the latch in the latched and unlatched positions.

According to another aspect of the disclosure, the automotive under seat storage apparatus comprises a drawer movable in a travel direction from beneath the automotive seat and opposed latches movable in a direction transverse to the travel direction from latched positions retaining the drawer closed and unlatched positions. A handle is adapted for moving the opposed latches toward each other in the transverse direction to an unlatched position for releasing the drawer for opening.

Each latch may include a sloped wall, and the handle may include a pin for engaging the sloped wall and moving the latch inwardly when the handle moves upwardly in a vertical direction. The drawer may include a wall including a first guide for guiding the handle for movement in a vertical direction and a second guide for guiding the first latch for movement in a direction transverse to the travel direction.

Still a further aspect of the disclosure pertains to an apparatus for storing articles beneath an automotive seat including a drawer movable in a travel direction from a closed position beneath the automotive seat to an open position. A first latch is for latching the drawer in the closed position, and a handle is provided for releasing the first latch. The drawer includes a wall including a first guide for guiding the handle for movement in a vertical direction and a second guide for guiding the first latch for movement in a direction transverse to the travel direction.

A second latch may be provided for latching the drawer in the first position, the handle for releasing the second latch, and the wall may include a third guide for guiding the second latch in the transverse direction. The second guide may comprise a T-shaped projection and the first latch includes a groove for receiving the projection.

In the following description, several embodiments of latching mechanism for an automotive under seat drawer are shown and described. As it should be realized, the arrangement is capable of other, different embodiments and its several details are capable of modification in various, obvious aspects all without departing from the latching mechanism for an automotive under seat drawer as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the disclosed latching mechanism for an automotive under seat drawer, serve to explain certain principles thereof. In the drawing figures.

Reference will now be made in detail to the present preferred embodiments of the latching mechanism, examples of which are illustrated in the accompanying drawing figures.

DETAILED DESCRIPTION

Figure 1:
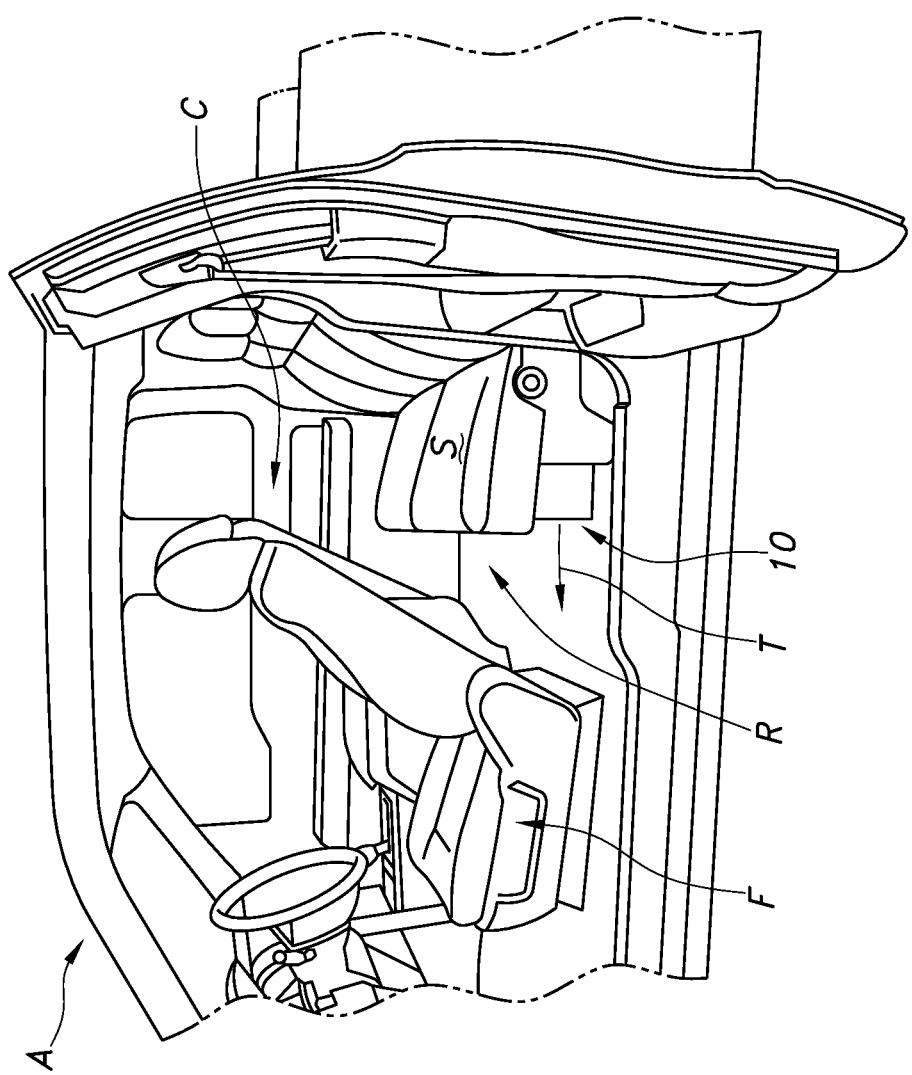
FIG. 1 is a partially cutaway side view of an automobile, illustrating one possible application of certain aspects of this disclosure.

Reference is now made to FIGS. 1-10, which illustrate a drawer 10 with an improved latching mechanism 12 forming an aspect of the disclosure. The drawer 10 may be used in a cabin C of an automobile A and, in particular, under or beneath a seat S for a vehicle operator or passenger, and arranged for movement in a travel direction T typically aligned with the direction of vehicle movement when traveling. The illustration in FIG. 1 shows the drawer 10 used in connection with a rear seat (arrow R), but it can be appreciated that the drawer may be used in connection with the front seat (arrow F) as well, or possibly at other convenient locations in an automobile.

Figure 2:
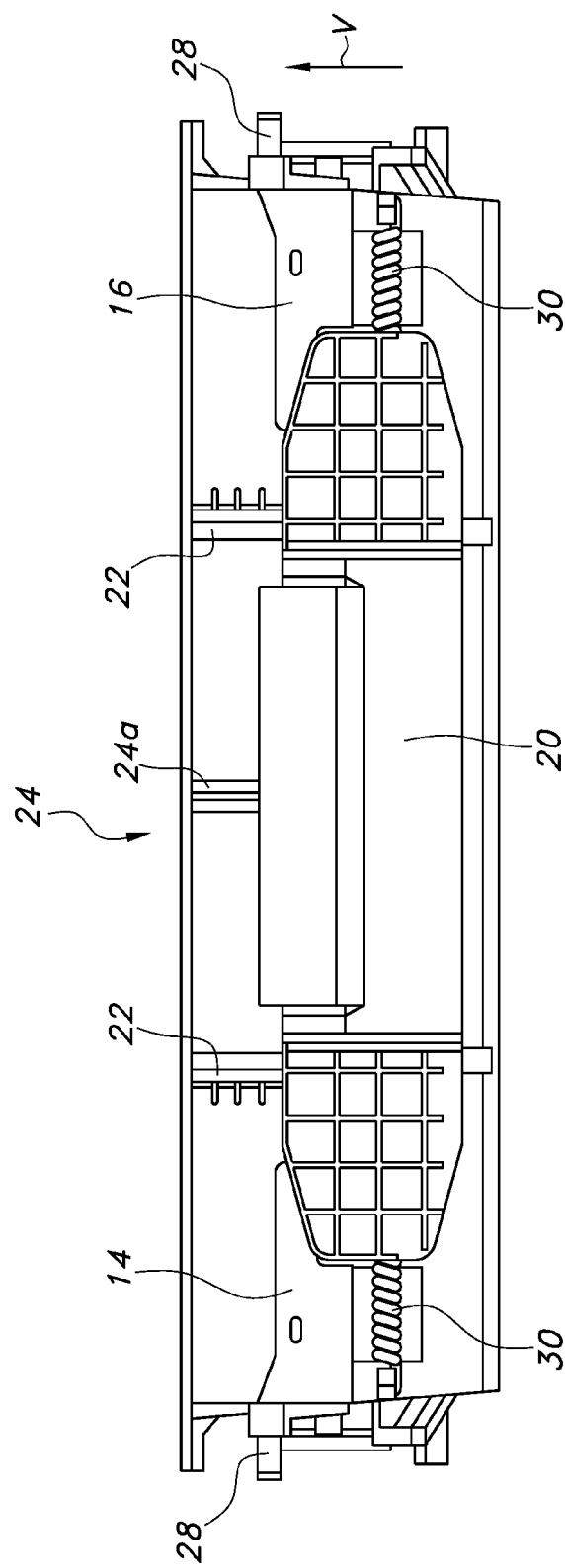
FIG. 2 is a front view of an under sear drawer with a latching mechanism according to the disclosure.
Figure 3:
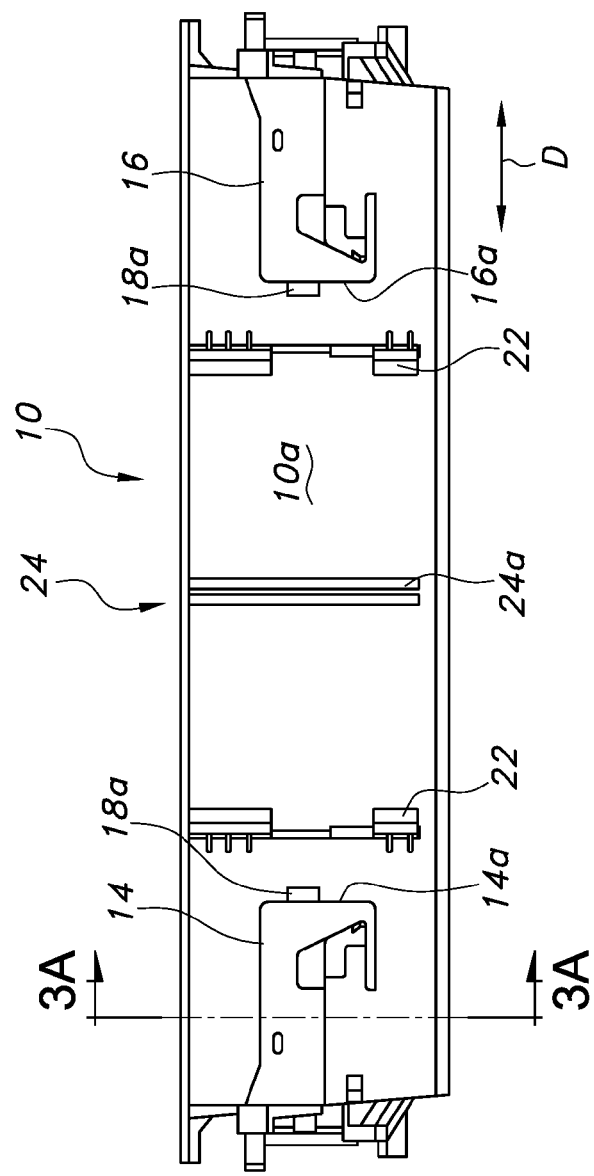
FIG. 3 is a front view of a front wall of the drawer showing the positioning of opposed latches for latching the drawer closed.
Figure 3A:
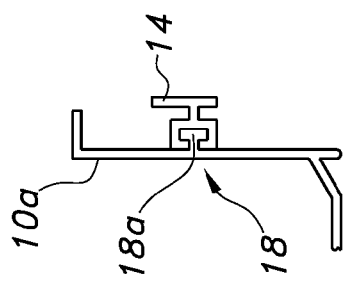
FIG. 3A is a sectional view taken along line 3A-3A of FIG. 3.

Turning to FIGS. 2-3, the latching mechanism 12 is illustrated in detail. The mechanism 12 includes a pair of opposed latches 14, 16 for latching or locking the drawer 10 in a closed position, and for unlatching or unlocking to allow the drawer to move to an open position for accessing an associated storage compartment and any articles therein. The latches 14, 16 are mounted for sliding movement along corresponding guides 18 (only one shown in FIG. 3A), which are supported by the drawer 10, and in particular a front wall 10a thereof in the illustrated embodiment. As shown in FIG. 3A, the guides 18 may take the form of T-shaped projections 18a that slidably fit into elongated grooves 14a, 16a formed in the latches 14, 16 (see FIG. 5), and thus allow for relative sliding movement in a direction transverse D to the travel direction T. Using a secure type of one-way connection such as this advantageously allows for the latches 14, 16 to move to and fro in a highly repeatable and reliable manner with a minimum amount of rattling and resulting noise.

Figure 4:
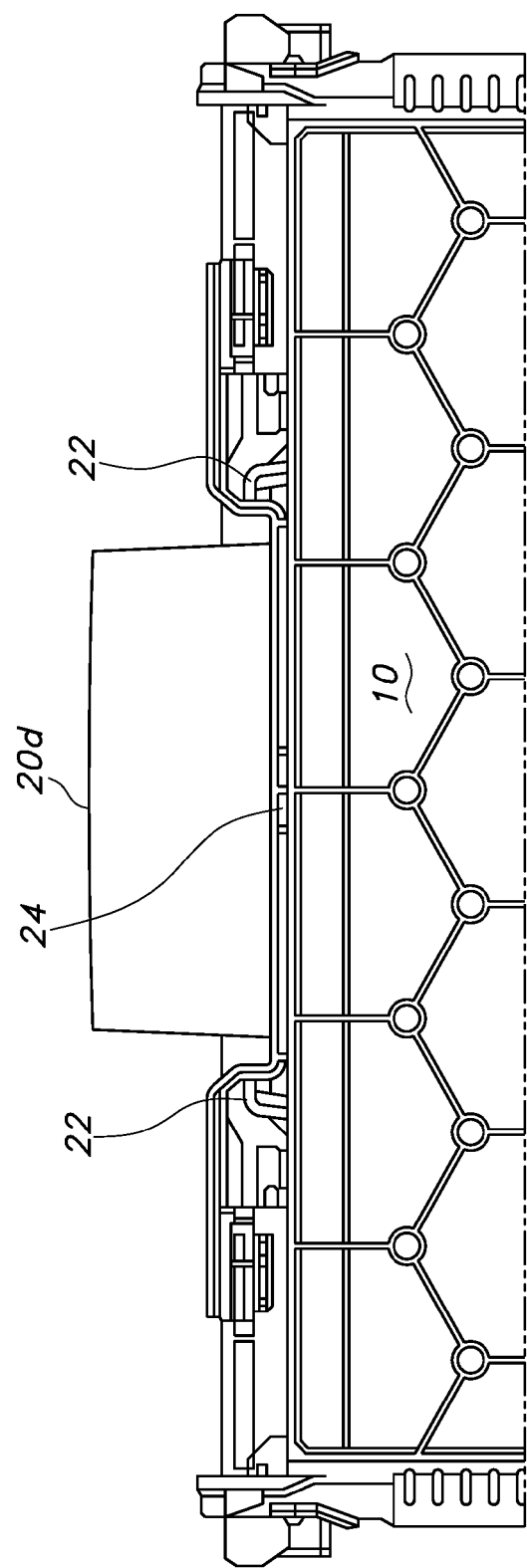
FIG. 4 is a partially cutaway bottom view of a front end of the drawer.
Figure 5:
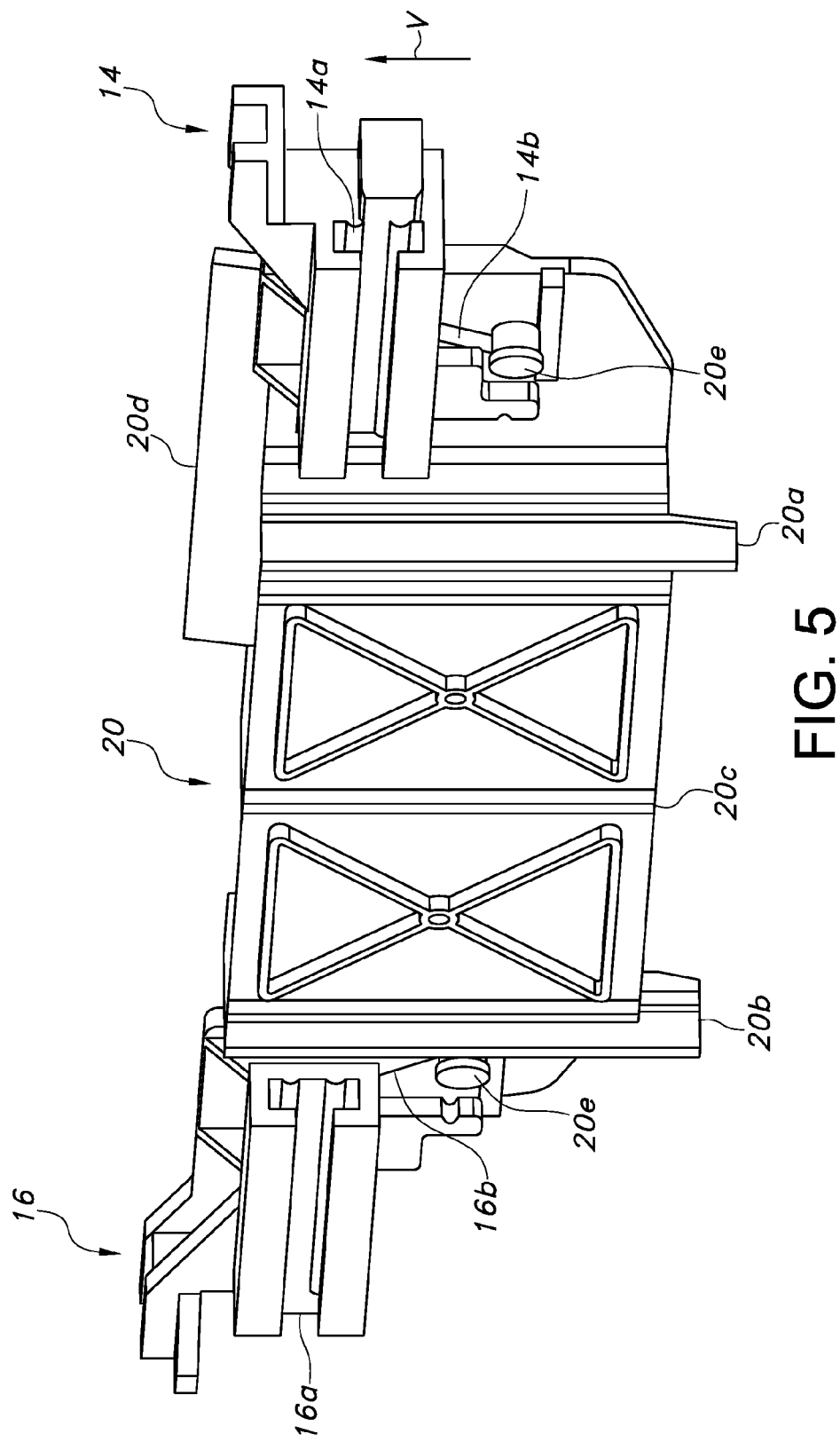
FIG. 5 is an isometric view showing the engagement of the handle and latches.
Figure 6:
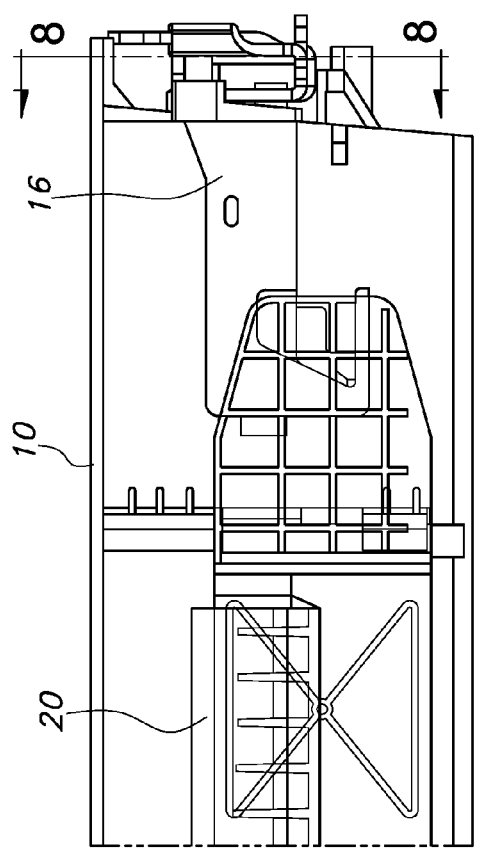
FIGS. 6 and 7 are cutaway front views illustrating the relative movement of the handle and latches.
Figure 7:
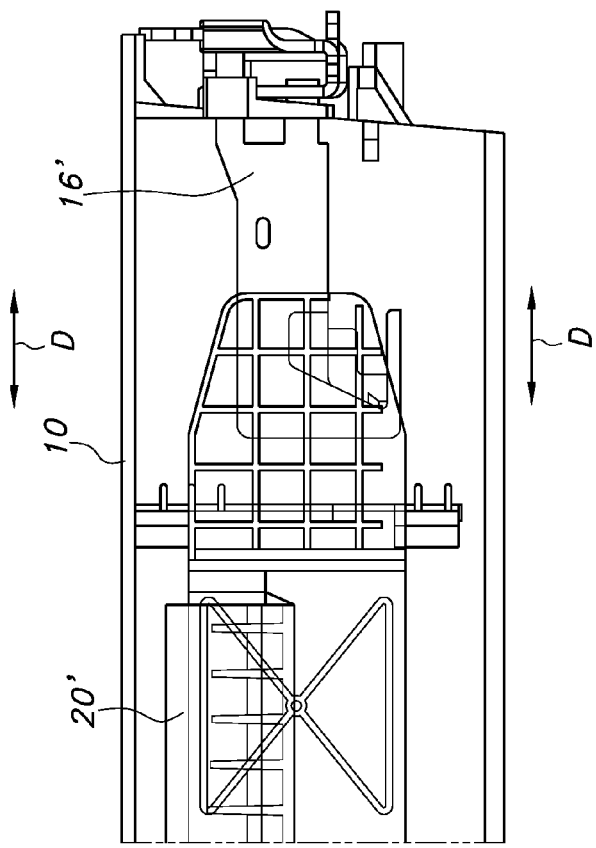

A cooperating handle 20 may also be provided for moving the latches 14, 16 in concert to release the drawer 10 for opening. Turning to FIGS. 2 and 4 in particular, the handle 20 may be guided for movement in a vertical direction V along the front wall 10a of the drawer 10. Specifically, the front wall 10a may include a pair of spaced, lateral guides 22 for interfacing with corresponding projections 20a, 20b on the handle 20. A central guide 24 may also be provided, which may comprise a groove 24a for interfacing with a portion 20c of the handle between the projections 20a, 20b. In view of the engagement with the guides 22, 24 in this manner, the stable and reliable movement of the handle 20, such as when an outwardly projecting portion 20d is grasped by a seated user and lifted, is assured without lateral shifting or rattling. Thus, a further contribution is thus made to the noise reduction issue that can plague conventional latching mechanisms for drawers, and particularly those used in automobiles in the under seat location and subjected to significant vibrations throughout their service life.

With combined reference to FIGS. 5-8, the manner in which the latches 14, 16 are actuated by the handle 20 when lifted in the vertical direction V to release the drawer 10 for opening is illustrated. As perhaps best understood from FIGS. 5 and 6 together, each latch 14, 16 includes a follower, which may take the form of a surface 14b, 16b sloping inwardly in the vertical direction V toward the center of the drawer 10. The handle 20 in turn includes cams in the forms of projecting pins 20e arranged to engage the respective surfaces 14b, 16b of the latches 14, 16, such as by moving therealong, in response to the linear movement in the vertical direction V. As a result of this engagement, and as can be understood by comparing FIGS. 6 and 7, the handle 20 is raised in the vertical direction V, the latches 14, 16 are caused to travel inwardly in an opposite fashion in alignment with the transverse direction D (note positions 16' and 20' in FIG. 7). The surfaces 14b, 16a may also extend in the transverse direction D to provide a resting place for the cams or pins 20e when the handle 20 is in the home condition, which thus means the latches 14, 16 partially surround and capture the pins.

The movement of the latches 14, 16 inwardly is completed by raising the handle 20 until the unlatched position is achieved and the drawer 10 is free for moving to the open position. As can be understood from FIGS. 8 and 9, the movement of the handle 20 may cause the latches (only latch 16 shown) to withdraw from a corresponding opening 26a, which may be formed in an associated railing 26 extending in the travel direction T. This railing 26 may also serve to support and guide the drawer 10 for movement to and fro in the travel direction T during opening and closing.

Figure 9:
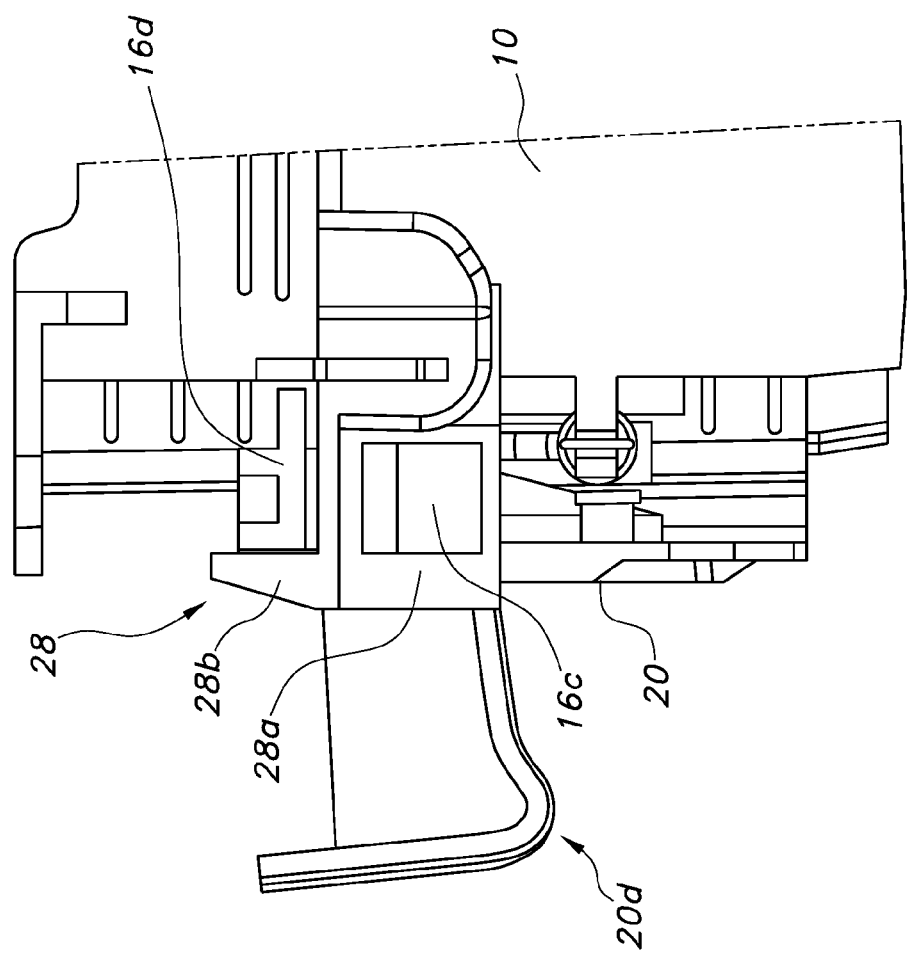
FIGS. 8, 9, and 10 are cutaway side views illustrating further details of the latches.
Figure 10:
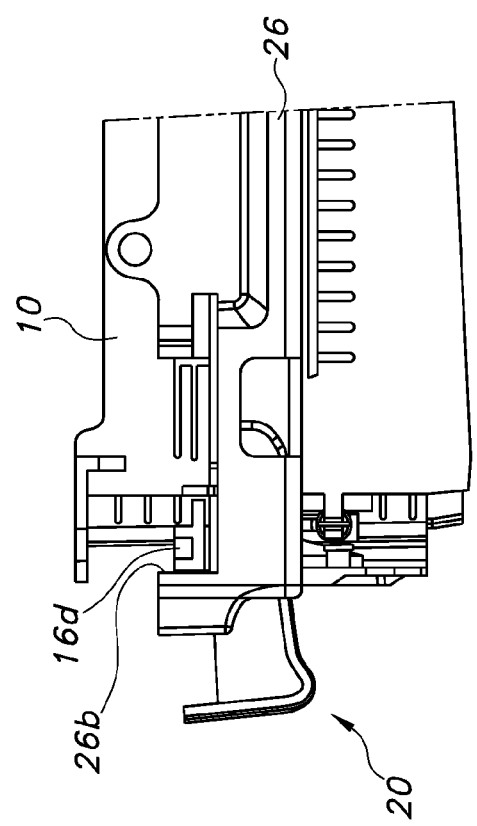

As indicated in FIGS. 9 and 10, the drawer 10 may also carry a guide 28 for guiding the latch 16 into the latched position. Specifically, the guide 28 may include a retainer, such as an opening 28a elongated vertically, for receiving a first projecting portion 16c of the latch 16 and guiding it into the opening 26a in a guide rail 26 when aligned therewith. To lend stability to the assembly and provide guidance during the opening of the drawer 10, the guide 28 may also include a face 28b for engaging a second projecting portion 16d of the latch 16, which may extend outwardly to engage a corresponding retainer, such as a wall 26b extending vertically from rail 26 (and arranged in a different vertical plane, as can be understood from FIGS. 6 and 7). A spring 30 may also extend between the drawer 10 and the latch 16 for similar construction may be provided for latch 14, but of course operating with that latch moving in the opposite direction as a result of actuation of the handle 20.

With reference to FIGS. 6 and 7 again, it can be understood that when the latch 16 is withdrawn to the maximum extent by the raising of the handles, the first and second projecting portions 16c, 16d are moved clear of the corresponding retainers, which are the opening 26a and the wall 26b of the rail 26. As can be understood from FIG. 2, a spring 30 may also extend between the drawer 10 and each latch 14, 16 to urge it toward the latched condition. Movement of the handle 20 vertically and the resulting camming engagement thus causes the springs 30 to expand concurrently.

Once the latches 14, 16 are released, the drawer 10 is thus cleared to move to the open position by pulling on the portion 20d once in the raised position. The handle 20 may then be released once moved forward. The combined forces of gravity acting thereon and the springs 30 return the latches 14, 16 toward the latched position, but removed from the engagement with the opening 26a and wall 26b to allow for free movement.

Figure 8:
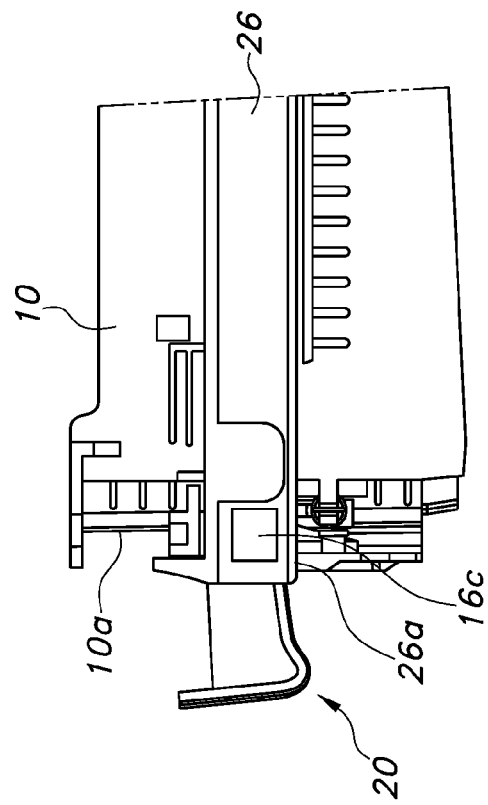

To reform the locking engagement, the handle 20 may simply be lifted and the drawer 10 returned to the closed position. The handle 20 may then be released when the projections 16c, 16d are in the proper alignment with the respective retainers (opening 26a and wall 26b). To aid in providing the proper locating function, the opening 26a may be elongated in the vertical direction V, and thus form a slot, as shown in FIG. 8.

The bodies of the latches 14, 16 and handle 20 may be formed of lightweight, durable materials, such as plastic. These parts may be easily formed using existing injection molding techniques, and in a manner that allows for relatively tight-fitting engagement to be realized on assembly. This mode of fabrication, combined with the above-mentioned construction, avoids creating any metal-on-metal contact, and thus contributes to reduced noise associated with rattling or the like during the operation of the automobile A. Yet, the secure engagement provided between the latches 14, 16 and the associated retainers, plus the reliable dual opposing movement caused by the single handle 20, provides a robust and reliable arrangement.

In summary, an improved latching mechanism 12 for an automotive under seat drawer 10 is provided. The latching mechanism 12 includes opposed latches 14, 16 slidably mounted to a guide 18 on a common support with a handle 20 mounted for moving in a vertical direction V, also by sliding along guides 22, 24. The result is a secure latching arrangement that can be constructed out of low cost, plastic parts without compromising security and without increased vehicle noise as a result of rattling or the like.

The foregoing has been presented for purposes of illustration and description. It is not intended to be exhaustive or to limit the embodiments to the precise form disclosed. Obvious modifications and variations are possible in light of the above teachings. For instance, while two latches 14, 16 create a secure arrangement, only one latch might be used, in which case the handle 20 would engage only the single latch 14 or 16. Furthermore, the latches might not be of the same or similar construction. All such modifications and variations are within the scope of the appended claims when interpreted in accordance with the breadth to which they are fairly, legally and equitably entitled.

What is claimed:

1. An apparatus for storage under an automotive seat, comprising:
    a drawer movable in a travel direction from beneath the automotive seat;
    a latch movable transverse to the travel direction from a latched position retaining the drawer closed and an unlatched position, the latch including a follower; and
    a vertically movable handle including a cam cooperating with the follower for moving the latch to the unlatched position for releasing the drawer for opening.

2. The apparatus of claim 1, further including a second latch movable transverse to the travel direction from a latched position retaining the drawer closed and an unlatched position for releasing the drawer for opening, the second latch including a second follower for engaging a second cam of the handle.

3. The apparatus of claim 2, wherein the latches are movable in opposite directions between the latched and unlatched positions.

4. The apparatus of claim 2, wherein each follower comprises a sloped wall on the latch, and each cam comprises a pin for engaging the sloped wall and moving the latch inwardly as the handle moves upwardly in a vertical direction.

5. The apparatus of claim 1, further including guides on a front wall of the drawer for the latch and the handle.

6. The apparatus of claim 1, further including a spring for urging the latch to the latched position.

7. The apparatus of claim 1, further including a guide for receiving a first portion of the latch in the latched position, the first portion of the latch disengaging from the guide for releasing the drawer for opening.

8. The apparatus of claim 7, wherein the guide comprises an opening elongated in a vertical direction.

9. The apparatus of claim 7, wherein the guide includes a wall for engaging a second portion of the latch in the latched and unlatched positions.

10. An automobile including the apparatus of claim 1.

11. An apparatus for storage under an automotive seat, comprising:
    a drawer movable in a travel direction from beneath the automotive seat;
    opposed latches movable in a direction transverse to the travel direction from latched positions retaining the drawer closed and unlatched positions; and
    a handle adapted for moving the opposed latches toward each other in the transverse direction to an unlatched position for releasing the drawer for opening.

12. The apparatus of claim 11, wherein each latch includes a sloped wall, and wherein the handle includes a pin for engaging the sloped wall and moving the latch inwardly when the handle moves upwardly in a vertical direction.

13. The apparatus of claim 11, further including a spring for urging each latch to the latched position.

14. The apparatus of claim 11, wherein the drawer includes a wall including a first guide for guiding the handle for movement in a vertical direction and second guides for guiding the latches for movement in a direction transverse to the travel direction.

15. The apparatus of claim 14, wherein the second guide comprises a T-shaped projection and the first latch includes a groove for receiving the projection.

16. An automobile including the apparatus of claim 11.

17. An apparatus for storing articles beneath an automotive seat, comprising:
    a drawer movable in a travel direction from a closed position beneath the automotive seat to an open position;
    a first latch for latching the drawer in the closed position; and
    a handle for releasing the first latch;
    wherein the drawer includes a wall including a first guide for guiding the handle for movement in a vertical direction and a second guide for guiding the first latch for movement in a direction transverse to the travel direction.

18. The apparatus of claim 17, further including a second latch for latching the drawer in the first position, the handle for releasing the second latch, and the wall including a third guide for guiding the second latch in the transverse direction.

19. The apparatus of claim 18, wherein the second guide comprises a T-shaped projection and the first latch includes a groove for receiving the projection.

20. An automobile including the apparatus of claim 17.

* * * * *